(12) United States Patent
Stern et al.

(10) Patent No.: US 9,156,538 B1
(45) Date of Patent: Oct. 13, 2015

(54) AIRCRAFT SKIN ATTACHMENT SYSTEM

(71) Applicant: The Boeing Company, Chicago, IL (US)

(72) Inventors: Eric Joseph Stern, Valmeyer, IL (US); Ryan Lee Hanks, Shipman, IL (US)

(73) Assignee: THE BOEING COMPANY, Chicago, IL (US)

( * ) Notice: Subject to any disclaimer, the term of this patent is extended or adjusted under 35 U.S.C. 154(b) by 185 days.

(21) Appl. No.: 13/947,430

(22) Filed: Jul. 22, 2013

(51) Int. Cl.
*B64C 1/12* (2006.01)
*B64C 3/26* (2006.01)

(52) U.S. Cl.
CPC .... *B64C 1/12* (2013.01); *B64C 3/26* (2013.01)

(58) Field of Classification Search
CPC ........... B64C 1/12; B64C 3/26; F16B 5/0032; F16B 5/0052; F16B 5/0614; F16B 12/22
See application file for complete search history.

(56) References Cited

U.S. PATENT DOCUMENTS

| | | | | |
|---|---|---|---|---|
| 2,962,252 | A * | 11/1960 | Edward | 248/231.81 |
| 3,920,206 | A * | 11/1975 | Bigham et al. | 244/132 |
| 5,088,661 | A * | 2/1992 | Whitener | 244/76 R |
| 6,443,508 | B1 * | 9/2002 | Persson | 292/300 |
| 7,686,251 | B2 * | 3/2010 | Tanner et al. | 244/132 |
| 7,810,295 | B2 * | 10/2010 | Thompson | 52/511 |
| 8,056,862 | B1 * | 11/2011 | Tomerlin et al. | 244/159.1 |
| 8,267,353 | B2 | 9/2012 | Childs | |
| 2010/0028074 | A1 * | 2/2010 | Etling | 403/24 |
| 2011/0260592 | A1 * | 10/2011 | Lin et al. | 312/265.5 |
| 2013/0146712 | A1 | 6/2013 | Stewart | |

FOREIGN PATENT DOCUMENTS

EP 1942052 B1 4/2013

OTHER PUBLICATIONS

Merle Henkenius, "How to Intall a Suspended Ceiling", Popular Mechanics (Jun. 30, 1996), accessed from http://www.popularmechanics.com/home/interior-projects/how-to/a168/1276121/ on Mar. 20, 2015.*

* cited by examiner

*Primary Examiner* — Tien Dinh
*Assistant Examiner* — Alexander V Giczy
(74) *Attorney, Agent, or Firm* — Yee & Associates, P.C.

(57) ABSTRACT

A method and apparatus for operating an aircraft. The aircraft is flown. A skin panel is held on a support structure. The support structure has flanges on a number of edges of the support structure, the flanges being substantially orthogonal to the edges. The support structure also has openings into the support structure substantially orthogonal to the flanges. First connecting structures on clips are connected to the flanges and positioned such that an opening in each clip is aligned with one of the openings in the support structure. The skin panel is positioned such that the clips are received in holes in the skin panel. Fasteners are attached to the second connecting structures such that the support structure holds the skin panel.

20 Claims, 20 Drawing Sheets

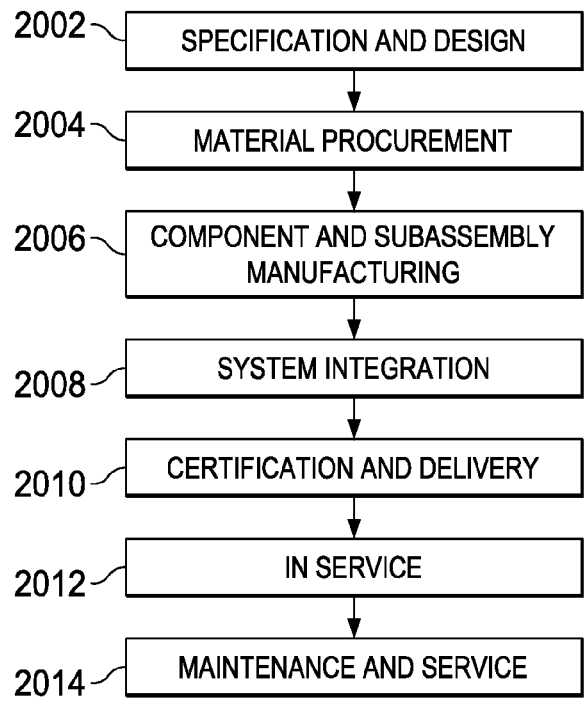
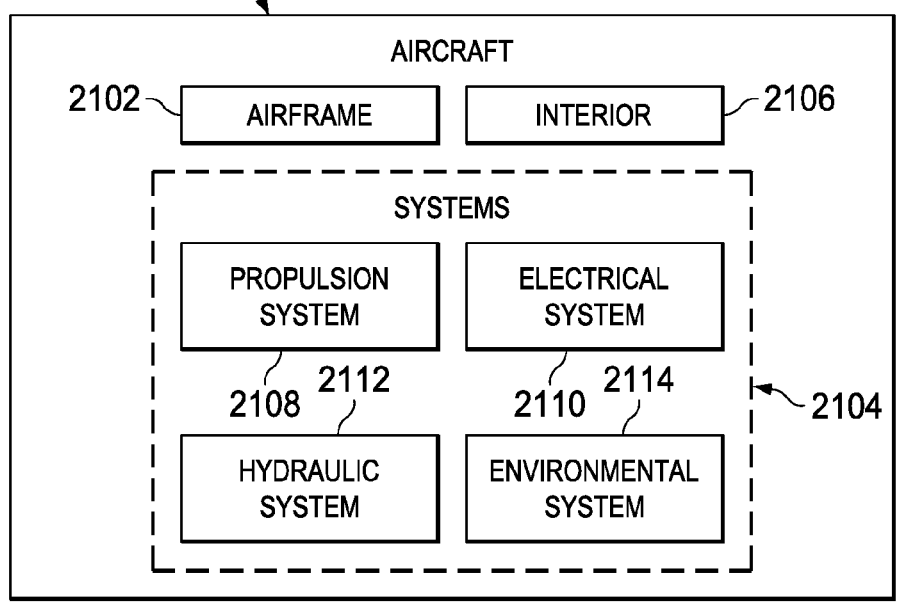

AIRCRAFT SKIN ATTACHMENT SYSTEM

BACKGROUND INFORMATION

1. Field

The present disclosure relates generally to aircraft and, in particular, to skin panels for aircraft. Still more particularly, the present disclosure relates to a method and apparatus for attaching skin panels to an aircraft.

2. Background

An aircraft is a complex vehicle with many different parts. In manufacturing an aircraft, different components are assembled to form the aircraft. These components include, for example, electrical systems, hydraulics, monuments, engines, landing gear, skin panels, and other components.

The skin or outer surface of an aircraft may be formed in many different ways. For example, skin panels may be attached to a frame for the aircraft. The skin panels may be comprised of various materials and may have different configurations. For example, a skin panel may be a sheet of metal, a sheet of composite material, a honeycomb sandwich panel, or other suitable forms.

Attaching a skin panel to a frame may be performed using fasteners. For example, the skin panel may be placed onto the frame. Holes may then be drilled into the skin panel and frame. Thereafter, fasteners may be installed to connect the skin panel to the frame.

The design of the frame in the use of fasteners to attach skin panels to the frame may be more expensive and difficult to install than desired.

Therefore, it would be desirable to have a method and apparatus that take into account at least some of the issues discussed above, as well as other possible issues.

SUMMARY

In one illustrative embodiment, an apparatus comprises a support structure, a flange, and a clip. The flange extends in a substantially orthogonal direction from an edge of the support structure. The clip has a first connecting structure configured to receive the flange and a second connecting structure configured to be connected to a second structure.

In another illustrative embodiment, a skin panel attachment system comprises a frame, flanges, a number of clips, a skin panel, and fasteners. The flanges are formed on a number of edges of the frame. The number of clips have first connecting structures and second connecting structures. The flanges are received in channels in the first connecting structures. The skin panels have holes. The second connecting structures are received in the holes. The fasteners are connected to the second connecting structures. The skin panel is connected to the frame.

In yet another illustrative embodiment, a method for connecting structures is presented. Clips are placed on flanges on a support structure such that first connecting structures on the clips engage the flanges. A second structure is positioned. The clips are received in holes in the second structure. Fasteners are attached to second connecting structures. The second structure is connected to the support structure.

In still another illustrative embodiment, a method for operating an aircraft is presented. The aircraft is flown. A skin panel is held on a support structure. The support structure has flanges on a number of edges of the support structure. First connecting structures on clips are connected to the flanges. The skin panel is positioned such that the clips are received in holes in the skin panel. Fasteners are attached to the second connecting structures such that the support structure holds the skin panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 20 is an illustration of an aircraft manufacturing and service method in the form of a block diagram in accordance with an illustrative embodiment; and FIG. 21 is an illustration of an aircraft in the form of a block diagram in which an illustrative embodiment may be implemented.

DETAILED DESCRIPTION

The illustrative embodiments recognize and take into account one or more different considerations. The illustrative embodiments recognize and take into account that attaching skin panels to different portions of an aircraft may be more difficult than desired.

For example, the illustrative embodiments recognize and take into account that attaching skin panels to the engine of an aircraft may be more difficult than in other areas. For example, the outlet portion of an engine for an aircraft may be subjected to much larger amounts of heat compared to other portions of the aircraft. The outlet portion of an aircraft may have a frame comprised of a metal such as titanium, inconel, or other materials that are suitable for use in temperature encountered at the outlet.

The illustrative embodiments recognize and take into account that fasteners may be installed in the frame of the output. Cutting in the frame for a fastener may be more difficult and is typically not performed because the strength of the frame may not be as great as desired when the frame is comprised of titanium. Threads that are cut into a metallic structure are considered stress risers and may not provide a desired level of performance for the metallic structure when tested. Threads cut in titanium may require greater tolerances in the design of the frame to take into account potential inconsistencies from openings with threads in which fasteners are installed to connect skin panels.

The illustrative embodiments also recognize and take into account that return flanges may be machined on the frame of an aircraft. A return flange is a flange that extends from an edge of a structure that is over a base portion of a structure. The return flange may hang over the base portion to form a pocket. The return flange on a web connected to the base portion may have an I shape.

The return flanges may be formed by machining the material used to form the frame. Holes may be drilled in the top of the return flanges and fasteners may be installed through the holes to connect the skin panel to the frame. To meet a desired performance, a flange may be required to extend away from the frame for some selected distance. As this distance increases, the manufacturing of the frame becomes more expensive and difficult.

Thus, the illustrative embodiments provide a method and apparatus for connecting skin panels to a frame of an aircraft. The illustrative embodiments may be applied to any structure that is connected to the support structure. In one illustrative embodiment, an apparatus comprises a support structure, a flange, and a clip. The flange extends in a substantially orthogonal direction from an edge of the support structure. The clip has a first connecting structure configured to receive the flange and a second connecting structure configured be connected to a structure.

Figure 1:
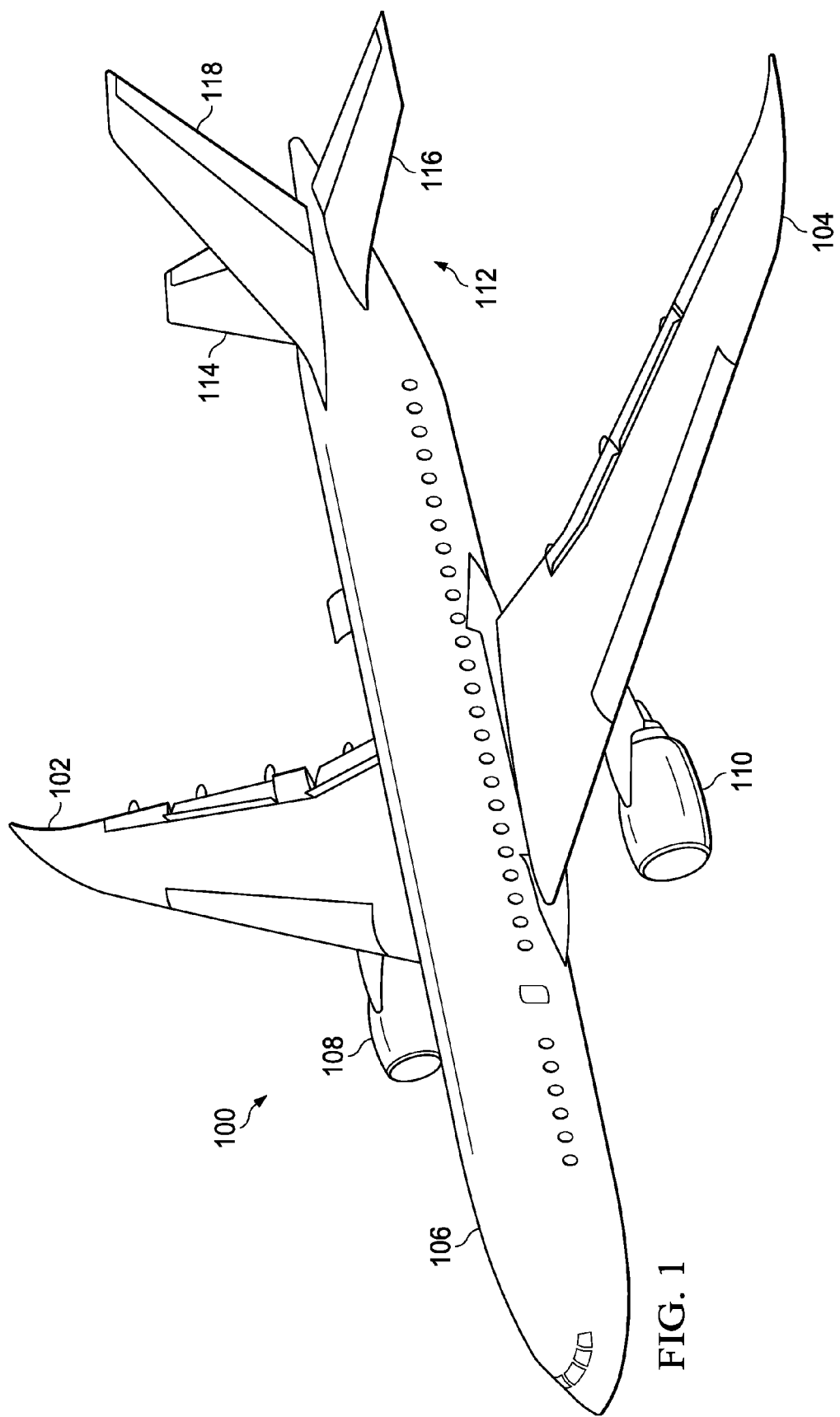
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an attachment system may be implemented to connect structures to each other in accordance with an illustrative embodiment. The attachment system may be used to attach a structure to a support structure. In particular, an illustrative embodiment may be used to attach skin panels to aircraft 100. In this manner, the attachment system may be a skin panel attachment system in this illustrative embodiment.

Figure 2:
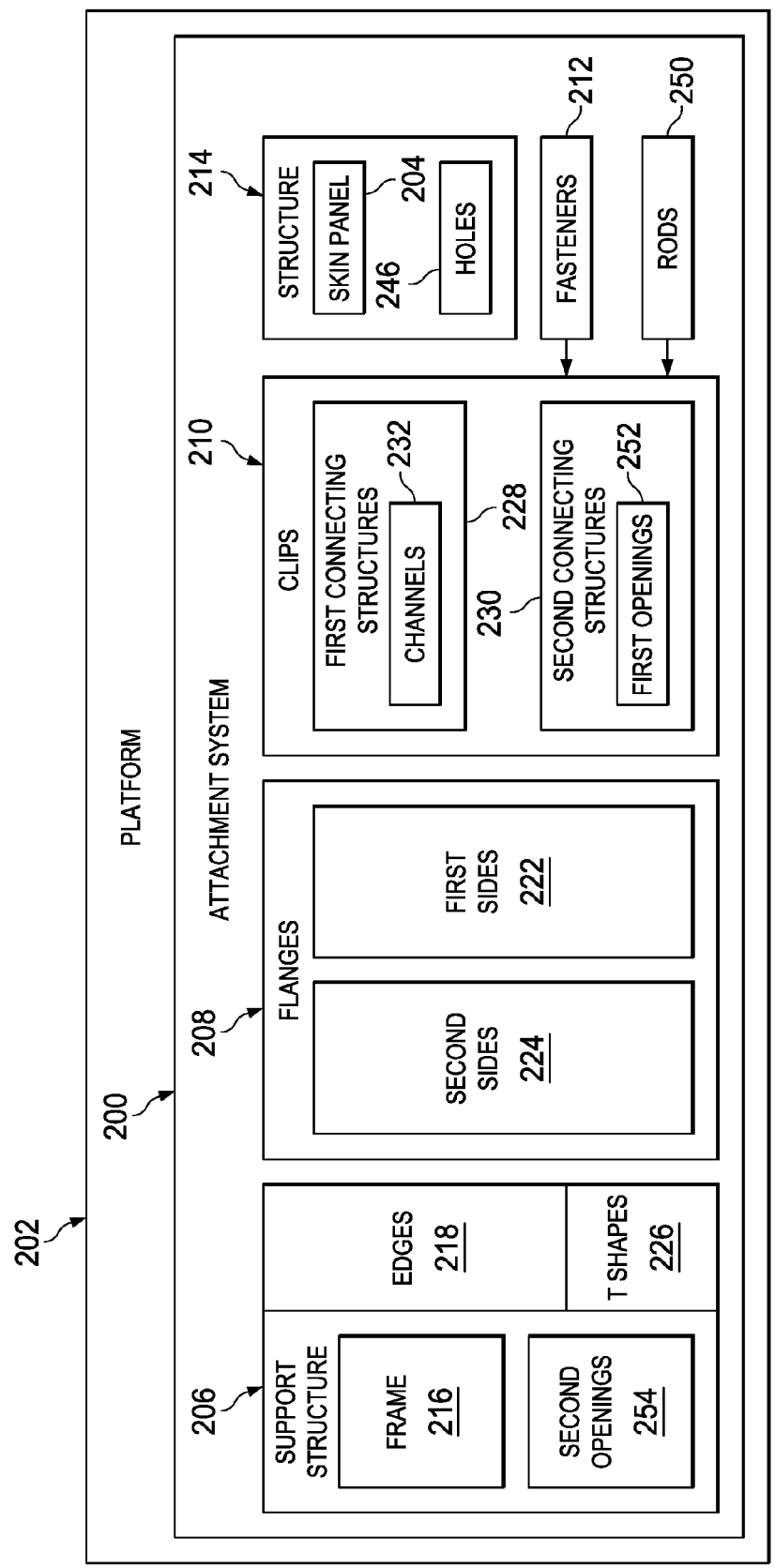
FIG. 2 is an illustration of a block diagram of an attachment system in accordance with an illustrative embodiment.

With reference now to FIG. 2, an illustration of a block diagram of an attachment system is depicted in accordance with an illustrative embodiment. In this depicted example, attachment system 200 may be in platform 202. The pictorial illustration of aircraft 100 in FIG. 1 is an example of platform 202.

In this illustrative example, attachment system 200 may be skin panel 204. As depicted, attachment system 200 includes support structure 206, flanges 208, clips 210, fasteners 212, and structure 214.

As depicted, support structure 206 is a structure configured to be connected to other structures, such as structure 214. Support structure 206 may hold structure 214 in place when structure 214 is connected to support structure 206.

In the illustrative example, support structure 206 may be, for example, frame 216 to which structure 214 may be connected. Support structure 206 may be, for example, selected from one of a rib, a spar, a stringer, and other suitable types of structures. In the illustrative example, support structure 206 may be comprised of different types of materials. For example, support structure 206 may be comprised of a material selected from one of titanium, aluminum, steel, plastic, a composite material, a metal, polycarbonate, or other suitable materials.

In the illustrative example, structure 214 may take different forms. For example, structure 214 may be selected from one of a skin panel, a floor panel, a wall panel, a honeycomb structure or other suitable structures. Structure 214 may be comprised of various materials. For example, structure 214 may include a material selected from one of titanium, aluminum, steel, plastic, a composite material, a metal, a polycarbonate, or other suitable types of materials.

Flanges 208 are formed on a number of edges 218 on support structure 206. As used herein, a "number of," when used with reference to items, means one or more items. For example, a number of edges 218 is one or more of edges 218.

As depicted, flanges 208 may have first sides 222 and second sides 224 extending from a number of edges 218. In particular, first sides 222 extend in an opposite direction from second sides 224 from the number of edges 218. In other words, T shapes 226 are formed by flanges 208 on the number of edges 218 of support structure 206.

In this illustrative example, first sides 222 and second sides 224 have substantially the same lengths. By having flanges 208 with two sides extending from the number of edges 218, the length of these two sides is shorter that having a single side extending one direction from the number of edges 218.

As depicted, clips 210 may be placed on flanges 208 on support structure 206. As depicted, clips 210 have first connecting structures 228 and second connecting structures 230.

First connecting structures 228 for clips 210 may engage flanges 208. For example, first connecting structures 228 have channels 232 configured to receive flanges 208.

In the illustrative example, second connecting structures 230 for clips 210 are configured to be connected to structure 214. Second connecting structures 230 are configured to receive fasteners 212 to connect structure 214 to support structure 206. In this example, fasteners 212 may be nuts.

Fasteners 212 may also take other forms such as pins, cotter pins, or other suitable devices in other illustrative examples.

In particular, structure 214 may have holes 246. Holes 246 may receive first connecting structures 228 and second connecting structures 230 with fasteners 212 being attached to second connecting structures 230. In other words, each opening in holes 246 may have a size and dimensions configured to receive all of a clip in clips 210. As a result, structure 214 is connected to support structure 206 using clips 210.

Additionally, in some illustrative examples, attachment system 200 also may include rods 250. For example, clips 210 may have first openings 252 in second connecting structures 230 and support structure 206 may have second openings 254. Rods 250 are configured to be placed through first openings 252 and second openings 254 and align clips 210 with flanges 208 in desired positions. In other words, first openings 252 and second openings 254 are configured to receive rods 250 such that clips 210 are aligned with flanges 208 at a desired position. Rods 250 may be removed or left in place after structure 214 is connected to support structure 206 using fasteners 212.

The illustration of attachment system 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although attachment system 200 has been described as a system for use with aircraft 100 in FIG. 1, the illustrative examples may be used to attach structures to support structures in other types of platforms other than aircraft 100. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, attachment system 200 may omit some components listed. For example, attachment system 200 may exclude support structure 206, structure 214, or both. These structures may be considered ones that are connected by attachment system 200 rather than part of attachment system 200.

Figure 3:
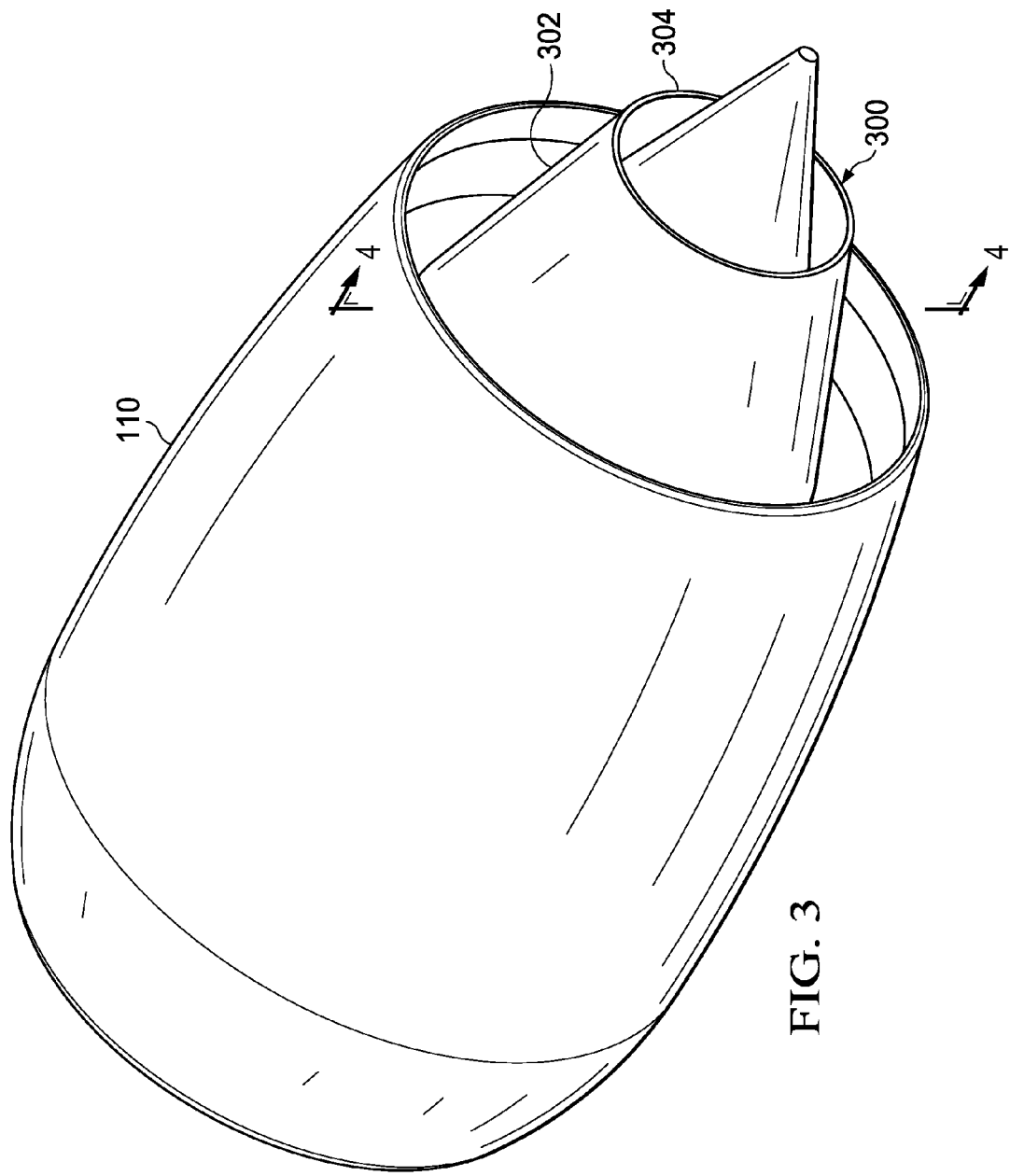
FIG. 3 is an illustration of an aircraft engine in accordance with an illustrative embodiment.

With reference now to FIG. 3, an illustration of an aircraft engine is depicted in accordance with an illustrative embodiment. In this illustrative example, a more detailed illustration of engine 110 on aircraft 100 in FIG. 1 is shown.

Engine 110 is an example of a structure on which skin panels may be attached using attachment system 200 in FIG. 2. For example, outlet 300 includes skin panels 302 and frame 304. Skin panels 302 are examples of an implementation for structure 214 and frame 304 is an example of an implementation for support structure 206 in FIG. 2.

Figure 4:
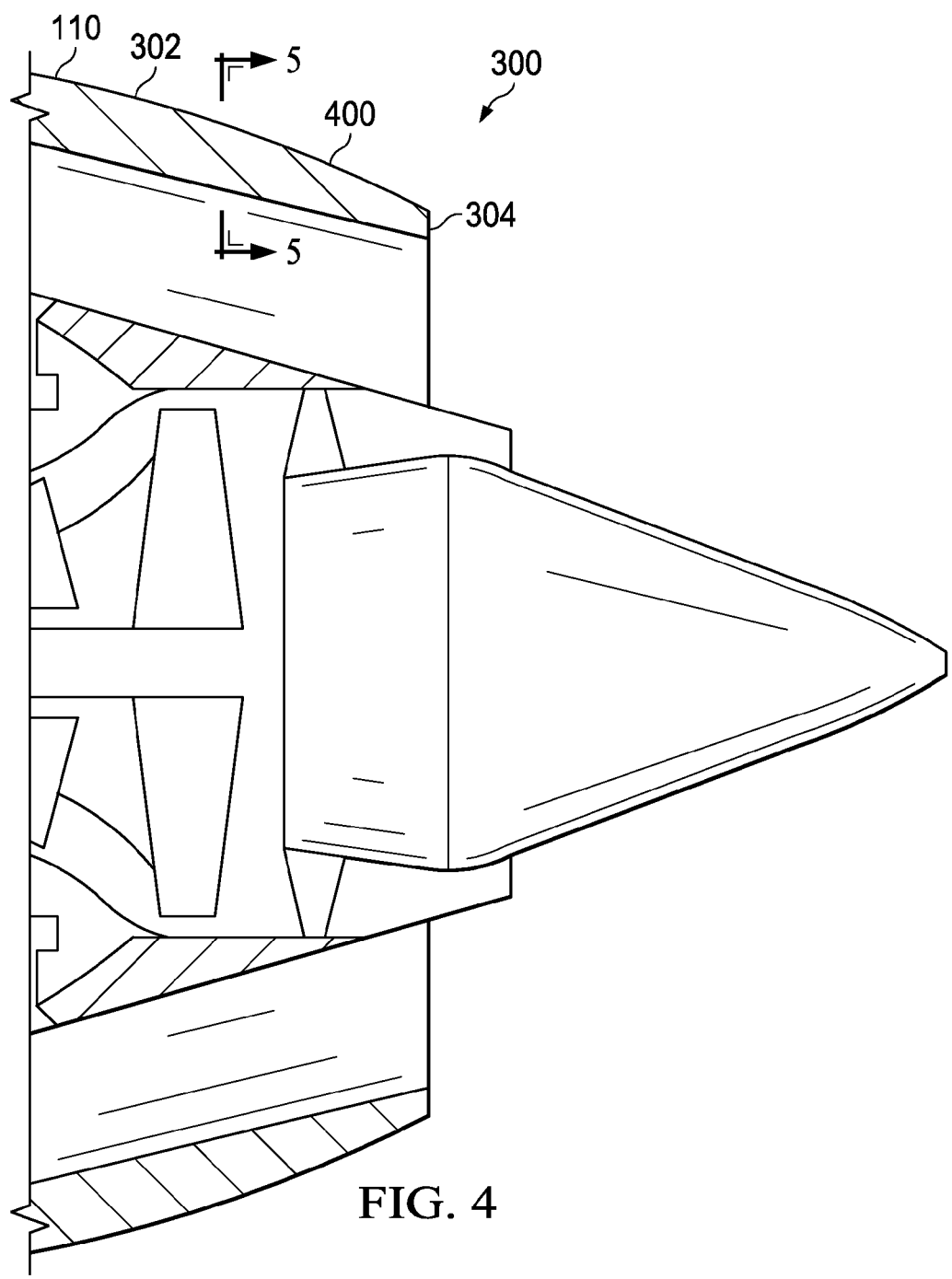
FIG. 4 is an illustration of a cross-sectional view of an engine for an aircraft in accordance with an illustrative embodiment.

With reference now to FIG. 4, an illustration of a cross-sectional view of an engine for an aircraft is depicted in accordance with an illustrative embodiment. In this illustrative example, a cross-sectional view of engine 110 is seen taken along lines 4-4 in FIG. 3. As can be seen in this example, skin panel 400 in skin panels 302 is shown on frame 304.

Figure 5:
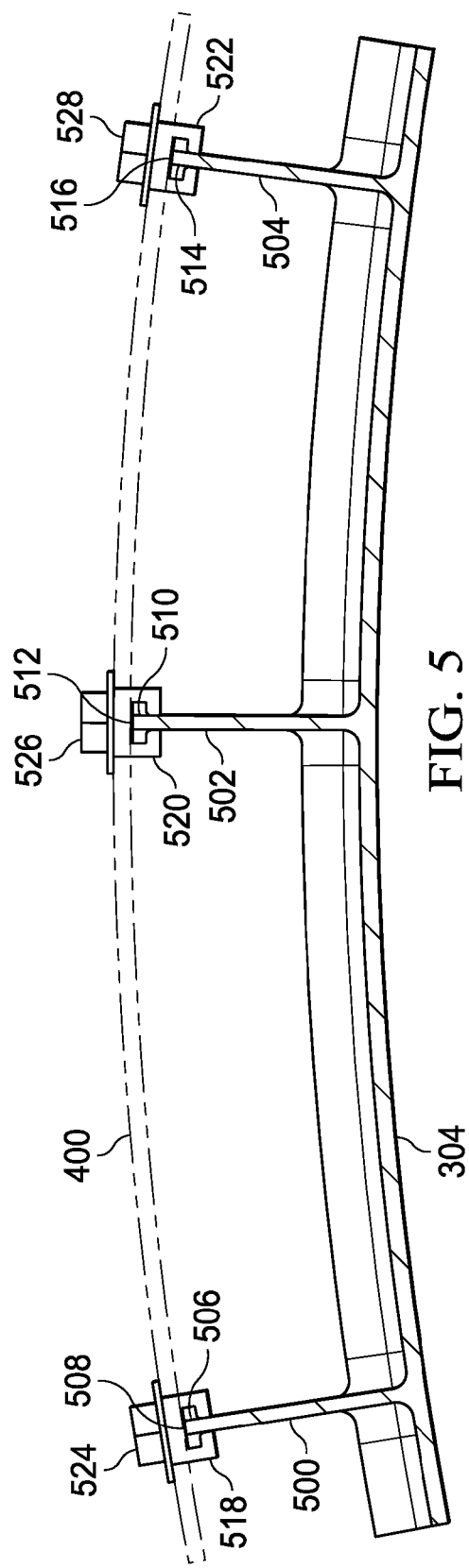
FIG. 5 is an illustration of a cross-sectional view of a frame with a skin panel for an outlet in accordance with an illustrative embodiment.

Turning now to FIG. 5, an illustration of a cross-sectional view of a frame with a skin panel for an outlet is depicted in accordance with an illustrative embodiment. In this illustrative example, a cross-sectional view of skin panel 400 on frame 304 on outlet 300 on engine 110 is shown taken along lines 5-5 in FIG. 4.

In this view, frame 304 has rib 500, rib 502, and rib 504. Flange 506 extends in a substantially orthogonal direction from edge 508 of rib 500 on frame 304 to form a T shape. In a similar fashion, flange 510 extends from edge 512 on rib 502, and flange 514 extends from edge 516 on rib 504. Flange 506, flange 510, and flange 514 may be return flanges in the illustrative examples.

As depicted, frame 304 with rib 500, rib 502, and rib 504 is described as an example of support structure 206 in FIG. 2. In some illustrative examples, rib 500, rib 502, and rib 504 may be considered to be support structures.

In the illustrative example, clip 518, clip 520, and clip 522 are used to connect skin panel 400 to frame 304 with fastener 524, fastener 526, and fastener 528. As can be seen in this illustrative example, clip 518 is engaged with flange 506; clip 520 is engaged with flange 510; and clip 522 is engaged with flange 514.

Skin panel 400 is engaged with clip 518, clip 520, and clip 522. Fastener 524, fastener 526, and fastener 528 are then connected to clip 518, clip 520, and clip 522, respectively, to connect skin panel 400 to frame 304.

Figure 6:
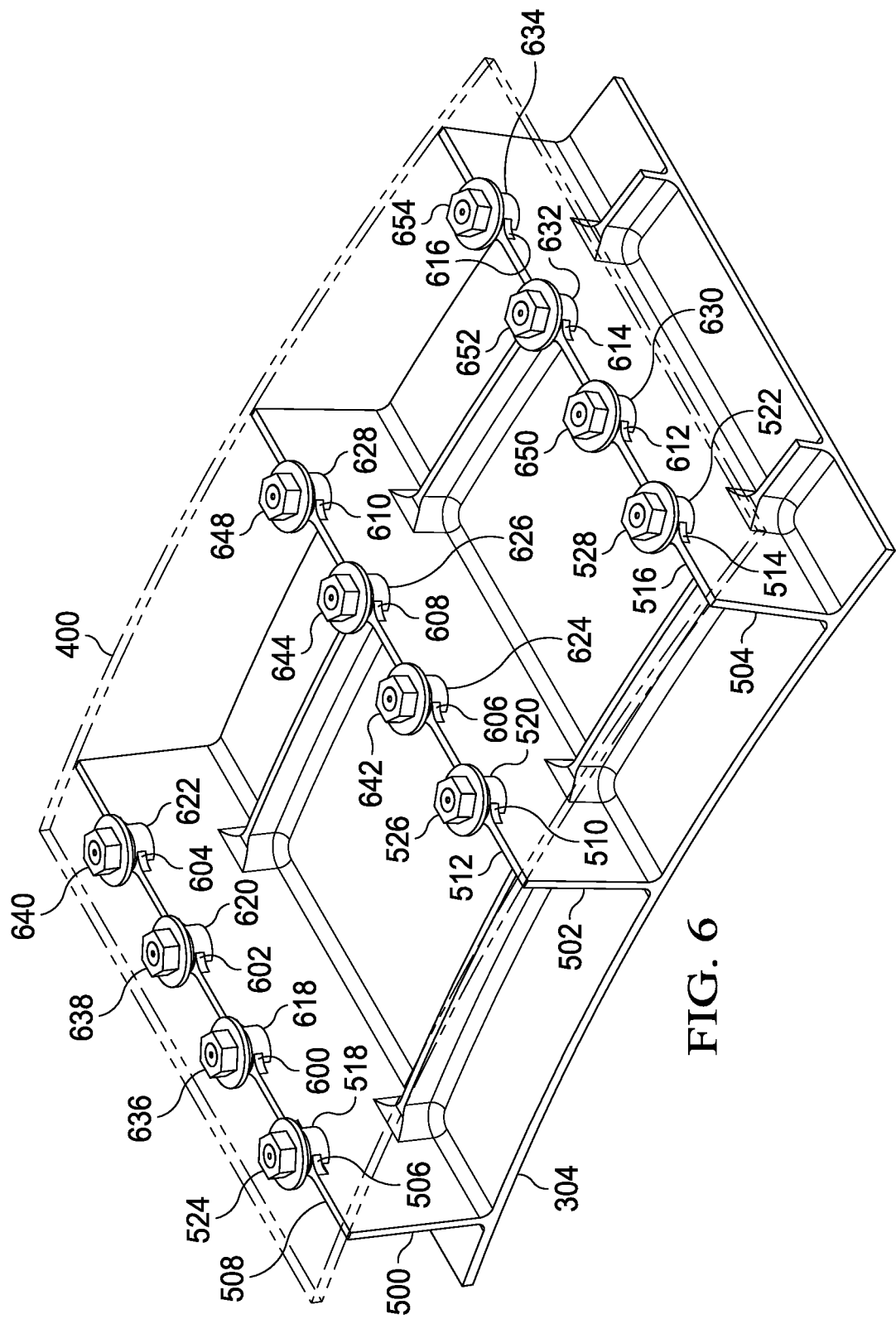
FIG. 6 is an illustration of a perspective view of a frame with a skin panel in accordance with an illustrative embodiment.

With reference now to FIG. 6, an illustration of a perspective view of a frame with a skin panel is depicted in accordance with an illustrative embodiment. In this illustration, a perspective view of the portion of frame 304 with skin panel 400 from the cross-sectional view in FIG. 5 is shown.

In this view, skin panel 400 is shown as being translucent to provide a better view of the different components in the attachment system used to attach skin panel 400 to frame 304. As depicted, rib 500 on frame 304 also has flange 600, flange 602, and flange 604 in addition to flange 506. Rib 502 also has flange 606, flange 608, and flange 610 in addition to flange 510. Rib 504 also has flange 612, flange 614, and flange 616 in addition to flange 514.

In this view, clip 618 is engaged with flange 600; clip 620 is engaged with flange 602; and clip 622 is engaged with flange 604 on rib 500. Clip 624 is engaged with flange 606; clip 626 is engaged with flange 608; and clip 628 is engaged with flange 610 on rib 502. In a similar fashion, clip 630 is engaged with flange 612; clip 632 is engaged with flange 614; and clip 634 is engaged with flange 616 on rib 504.

As depicted, additional fasteners are also present in addition to fastener 524, fastener 526, and fastener 528. In this illustrative example, fastener 636 is connected to clip 618; fastener 638 is connected to clip 620; fastener 640 is connected to clip 622; fastener 642 is connected to clip 624; fastener 644 is connected to clip 626; fastener 648 is connected to clip 628; fastener 650 is connected to clip 630; fastener 652 is connected to clip 632; and fastener 654 is connected to clip 634.

Figure 7:
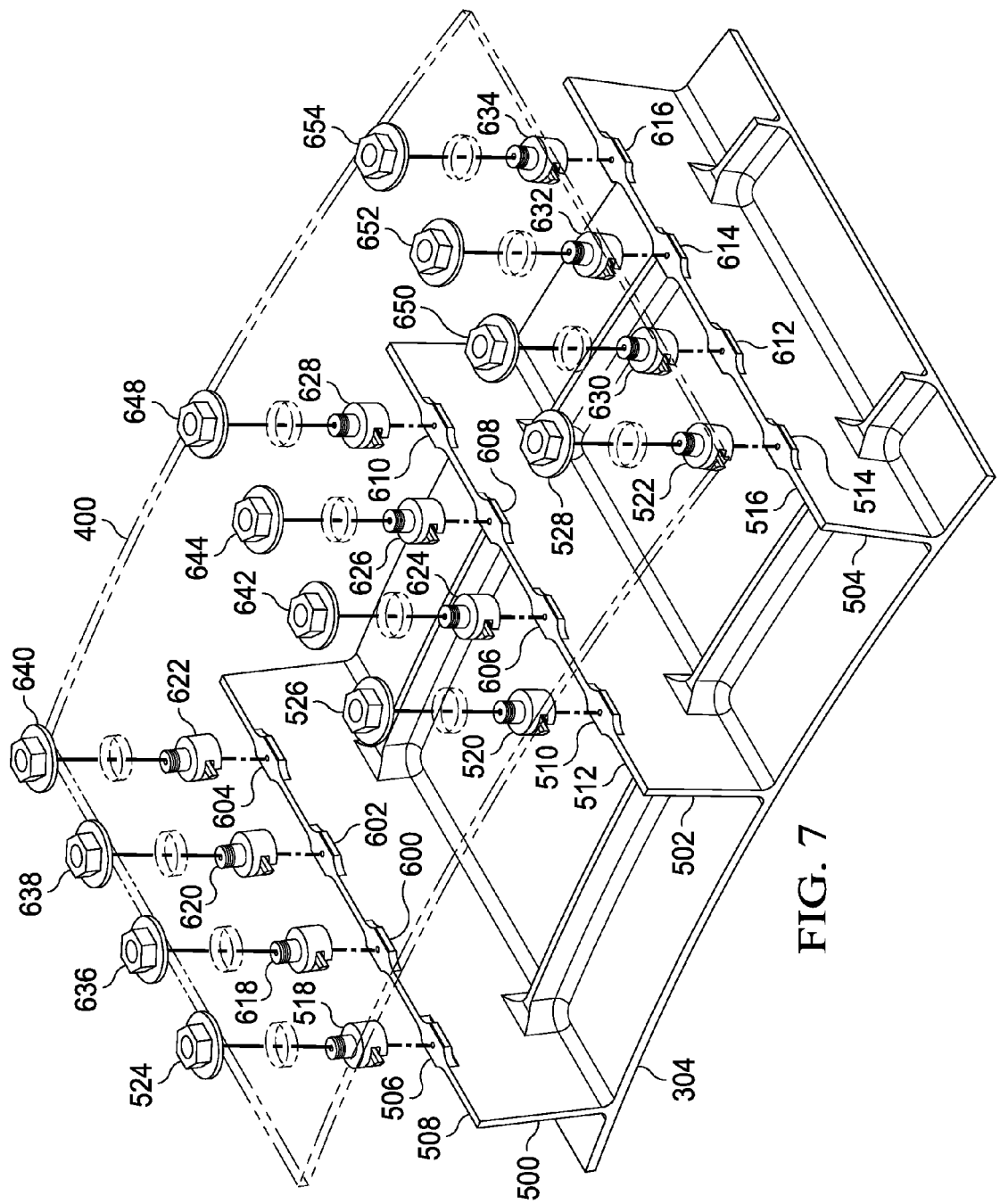
FIG. 7 is an illustration of an exploded view of a frame with a skin panel for an outlet in accordance with an illustrative embodiment.

With reference now to FIG. 7, an illustration of an exploded view of a frame with a skin panel for an outlet is depicted in accordance with an illustrative embodiment. As depicted, an exploded view of frame 304, skin panel 400, and the other component used to connect skin panel 400 to frame 304 are shown.

Figure 8:
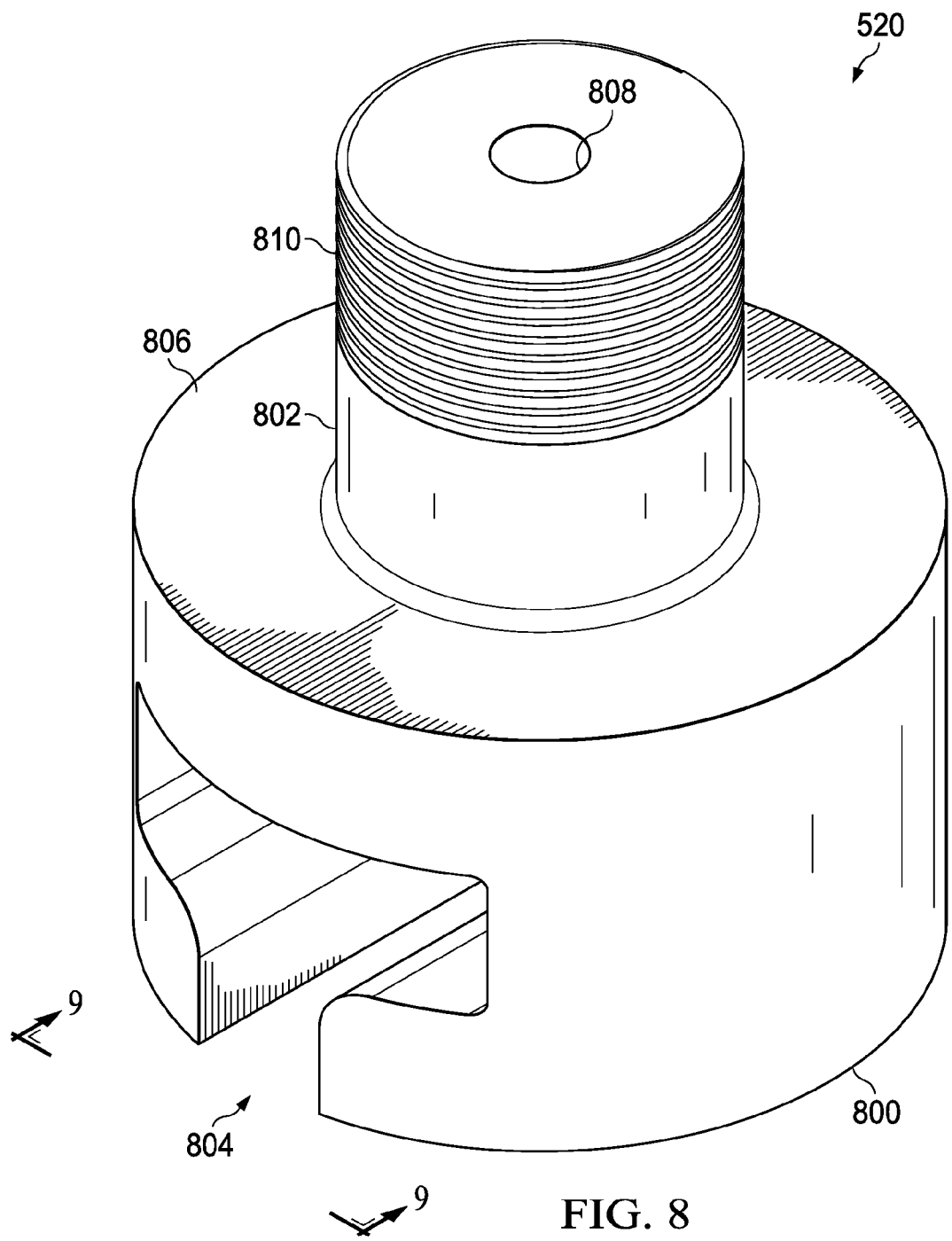
FIG. 8 is an illustration of a clip in accordance with an illustrative embodiment.

Turning now to FIG. 8, an illustration of a clip is depicted in accordance with an illustrative embodiment. A more detailed view of clip 520 in FIG. 5 is shown in a perspective view.

As can be seen, clip 520 has first connecting structure 800 and second connecting structure 802. First connecting structure 800 has a cylindrical shape. Additionally, first connecting structure 800 has channel 804. In this illustrative example, channel 804 is configured to receive flange 510 from FIGS. 5-7. Channel 804 has a configuration to allow flange 510 to be inserted within channel 804. In some cases, channel 804 may have dimensions that may allow for an interference fit to occur between first connecting structure 800 and flange 510.

Second connecting structure 802 has a cylindrical shape. Second connecting structure 802 extends from surface 806 of first connecting structure 800. Second connecting structure 802 in clip 520 has first opening 808 in this example. Additionally, second connecting structure 802 also includes threads 810. Threads 810 are configured to engage threads in fastener 526 from FIGS. 5-7 when fastener 526 is connected to second connecting structure 802.

Clip 520 may be comprised of one or more types of materials. For example, clip 520 may be comprised of titanium, aluminum, steel, plastic, composite material, a metal, polycarbonate, or other suitable materials.

Figure 9:
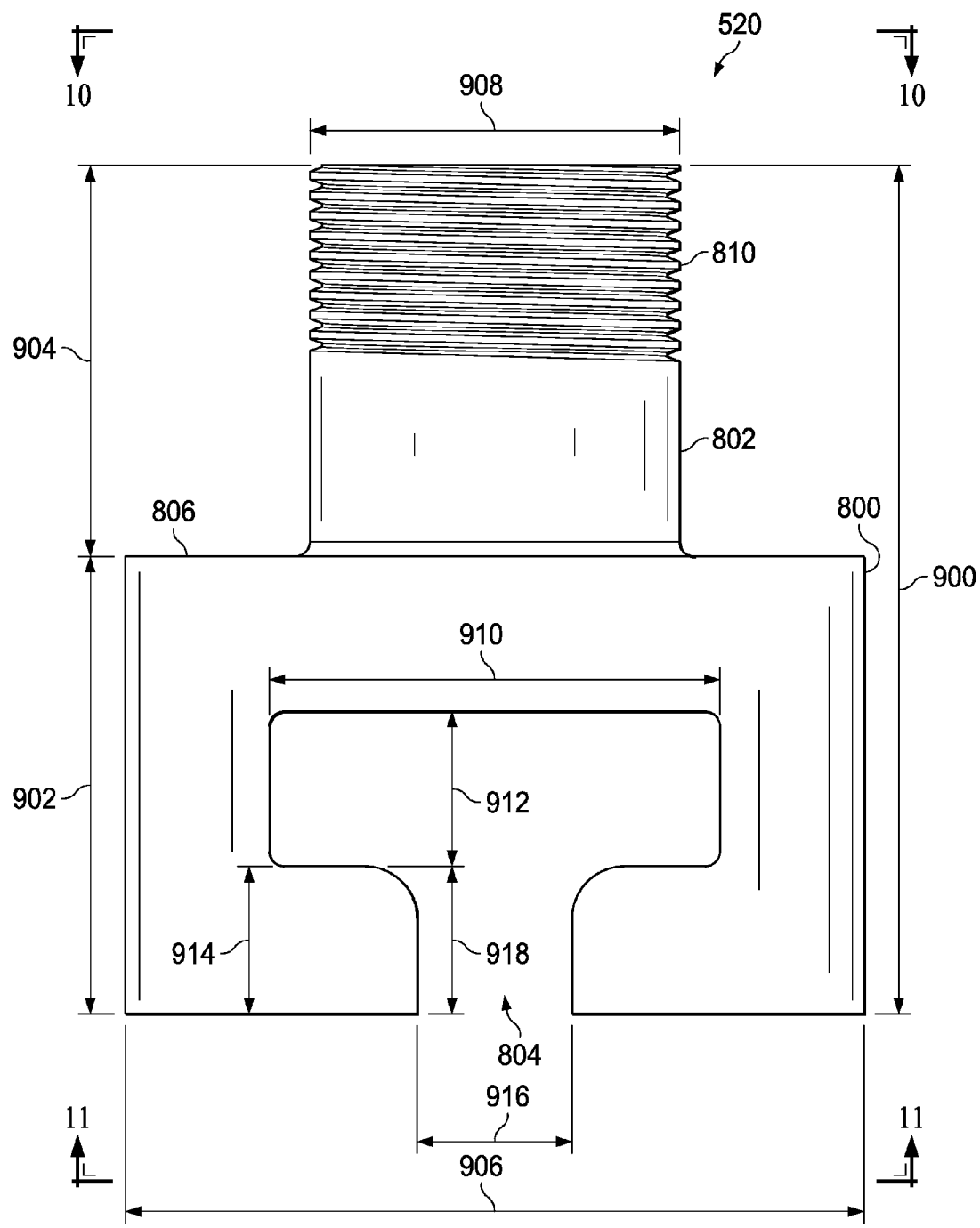
FIG. 9 is an illustration of a clip in accordance with an illustrative embodiment.

Turning now to FIG. 9, an illustration of a clip is depicted in accordance with an illustrative embodiment. In this figure, clip 520 is seen in a view taken in the direction of lines 9-9 in FIG. 8. In this view, a better view of channel 804 is shown. As can be seen, the shape of channel 804 conforms to a cross-sectional shape of flange 510 from FIGS. 5-7.

As can be seen in this view, clip 520 has height 900. First connecting structure 800 has height 902. Second connecting structure 802 has height 904. Additionally, first connecting structure 800 has diameter 906 and second connecting structure 802 has diameter 908. Channel 804 has width 910 and height 912. Further, portion 914 channel 804 also may have width 916 and height 918.

In one illustrative example, height 900 is about 0.575 inches, height 902 is about 0.300 inches, and height 904 is about 0.275 inches. Diameter 906 is about 0.500 inches and diameter 908 is about 0.250 inches. Width 910 is about 0.305 inches and height 912 is about 0.105 inches.

With respect to channel 804, width 910 is about 0.305 inches and height 912 is about 0.105 inches. In portion 914, width 916 is about 0.100 inches and height 918 is about 0.105 inches. Of course, these values may vary depending on the particular implementation.

Figure 10:
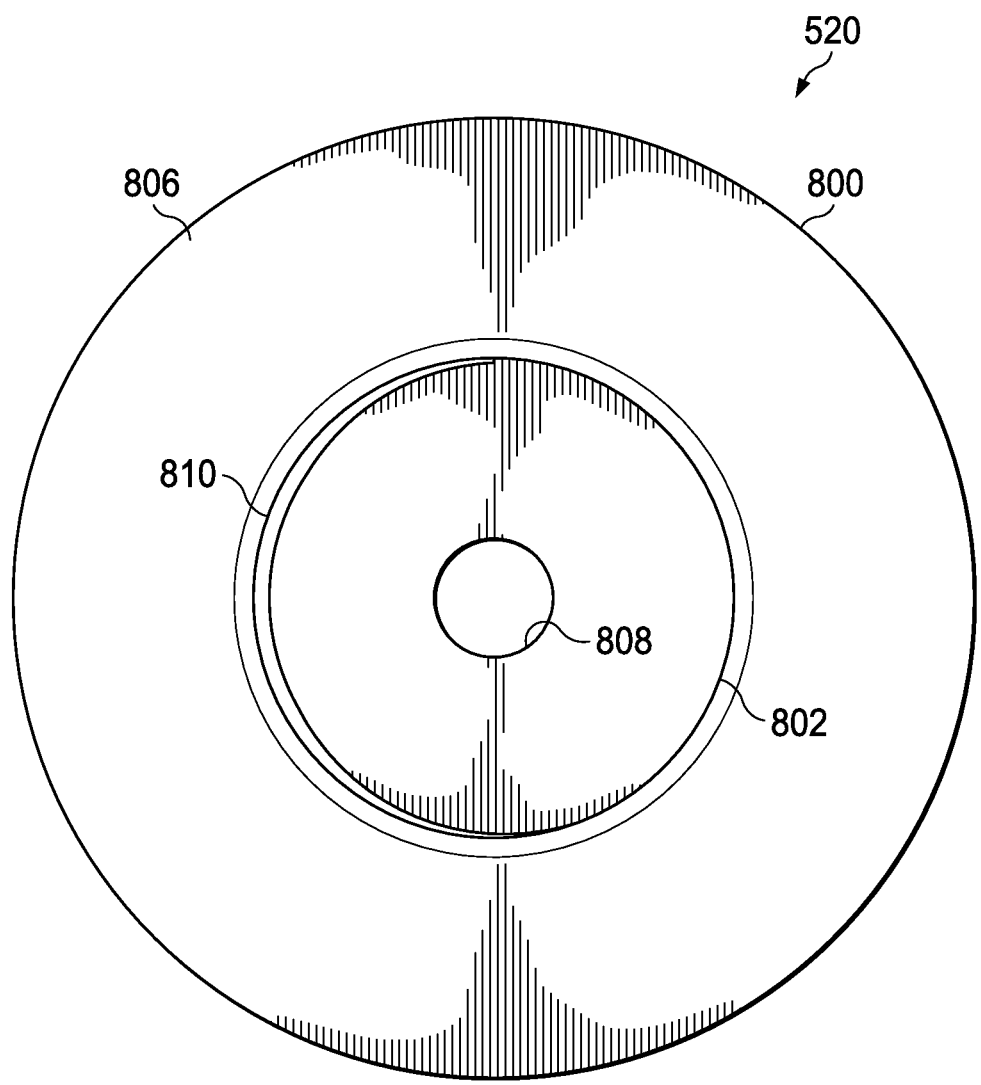
FIG. 10 is another illustration of a clip in accordance with an illustrative embodiment.

With reference now to FIG. 10, another illustration of a clip is depicted in accordance with an illustrative embodiment. In this figure, another view of clip 520 is shown from a view taken in the direction of lines 10-10 in FIG. 9.

In this view, first opening 808 is seen in second connecting structure 802. First opening 808 may receive an elongate structure such as a rod in rods 250 in FIG. 2.

Figure 11:
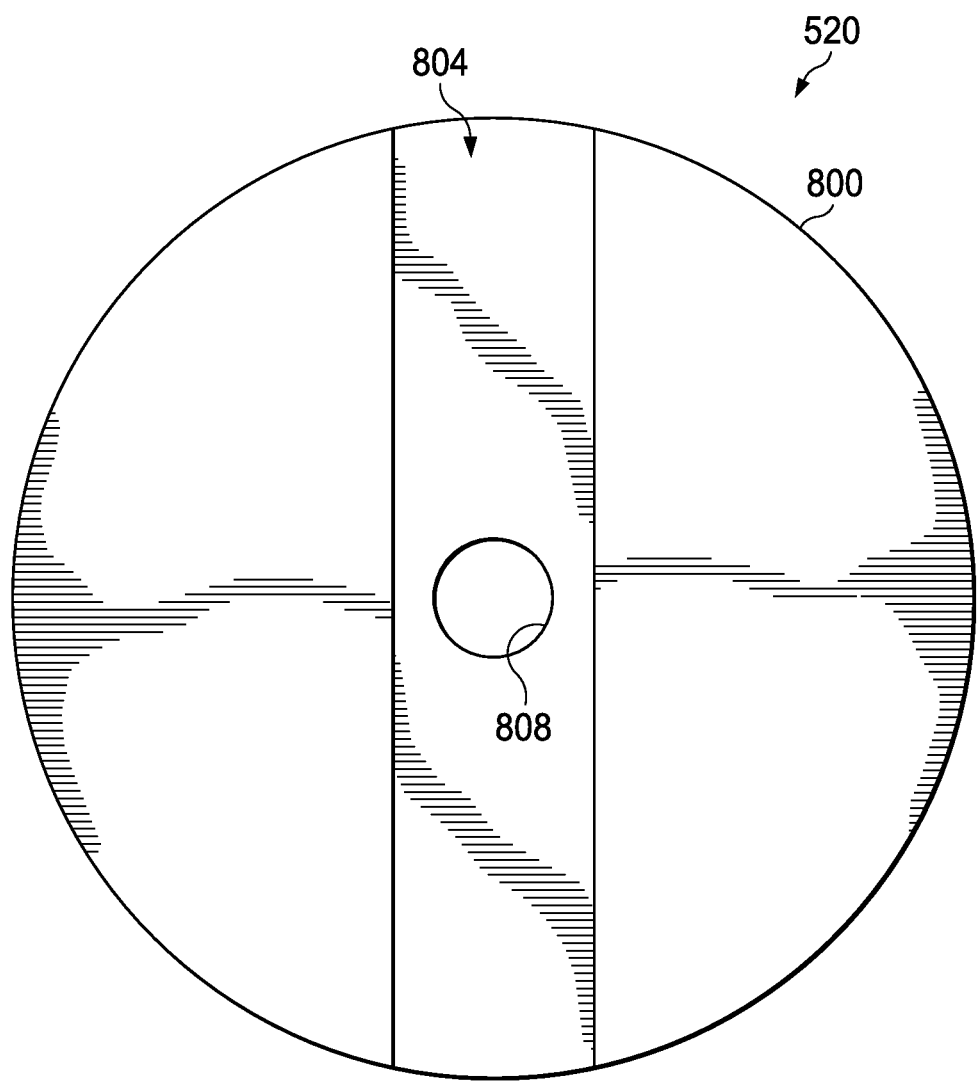
FIG. 11 is another illustration of a clip in accordance with an illustrative embodiment.

Turning now to FIG. 11, another illustration of a clip is depicted in accordance with an illustrative embodiment. In this figure, another view of clip 520 is shown from a view taken in the direction of lines 11-11 in FIG. 9.

In this view, channel 804 is seen in first connecting structure 800. First opening 808 also is seen in this view as extending through second connecting structure 802 from FIGS. 8-10 into channel 804.

The illustrations of clip 520 in FIGS. 8-11 are not meant to limit the manner in which clips 210 shown in block form in FIG. 2 may be implemented. For example, first connecting structure 800 is shown as having a cross section with a circular shape. In other illustrative examples, first connecting structure 800 may have other shapes such as an egg shape, an oval shape, a rectangular shape, or some other suitable shape.

Figure 12:
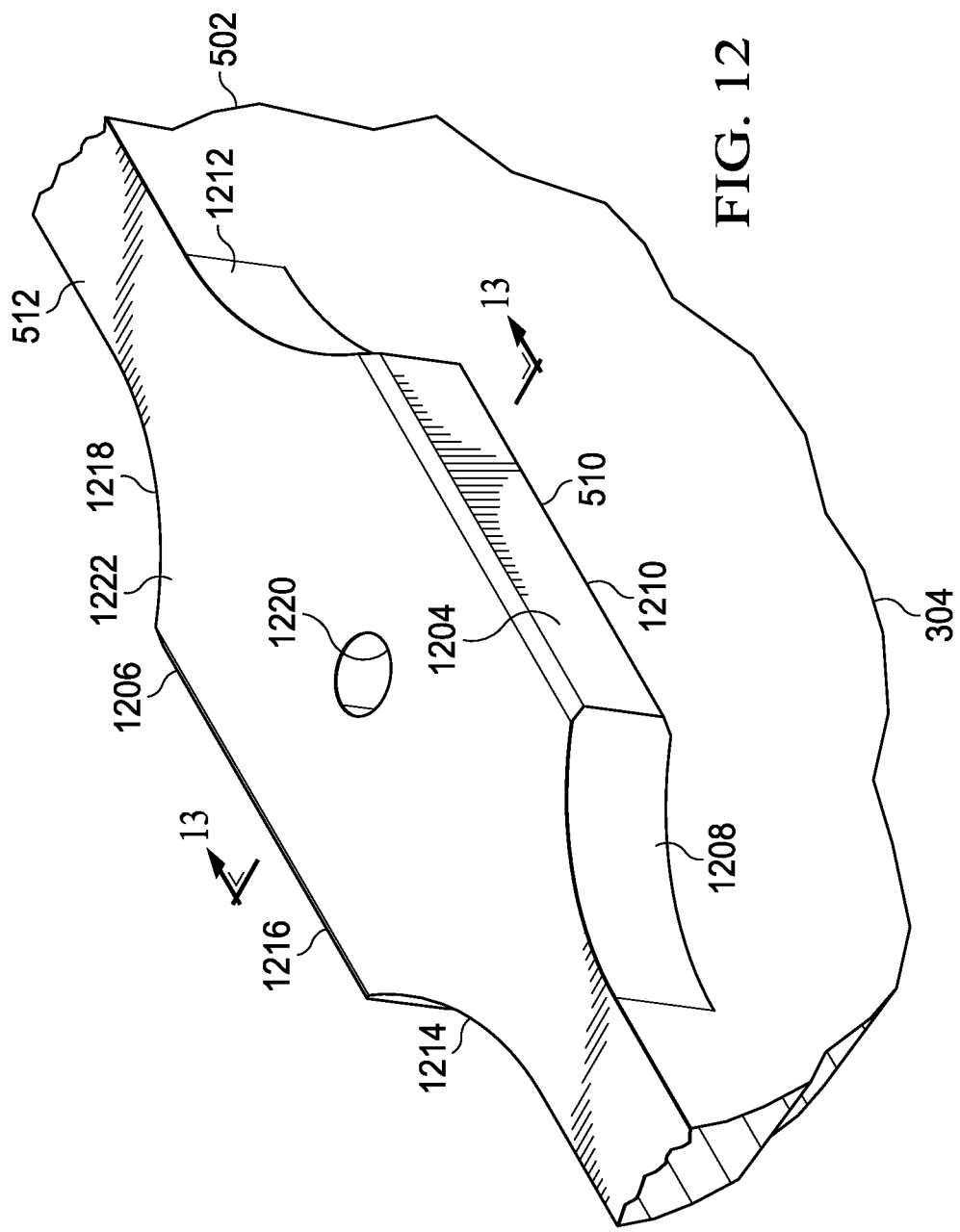
FIG. 12 is an illustration of a flange on a support structure in accordance with an illustrative embodiment.

Turning now to FIG. 12, an illustration of a flange on a support structure is depicted in accordance with an illustrative embodiment. A more detailed illustration of flange 510 on rib 502 on frame 304 is shown. In this example, flange 510 extends substantially orthogonally to rib 502 on edge 512.

Flange 510 has first side 1204 and second side 1206. First side 1204 extends substantially orthogonally from edge 512 and second side 1206 also extends substantially orthogonally from edge 512.

First side 1204 has curved section 1208, planar section 1210, and curved section 1212. In a similar fashion, second side 1206 has curved section 1214, planar section 1216, and curved section 1218.

In this illustrative example, second opening 1220 is shown in surface 1222 of flange 510 at edge 512 of rib 502. Second opening 1220 may be aligned with first opening 808 in clip 520 from FIGS. 8-11. This alignment of first opening 808 and second opening 1220 may be used to align clip 520 on flange 510 in a desired position. These openings may also be referred to as holes. For example, first opening 808 and second opening 1220 may be alignment holes used to align clip 520 with flange 510 in a desired position.

Figure 13:
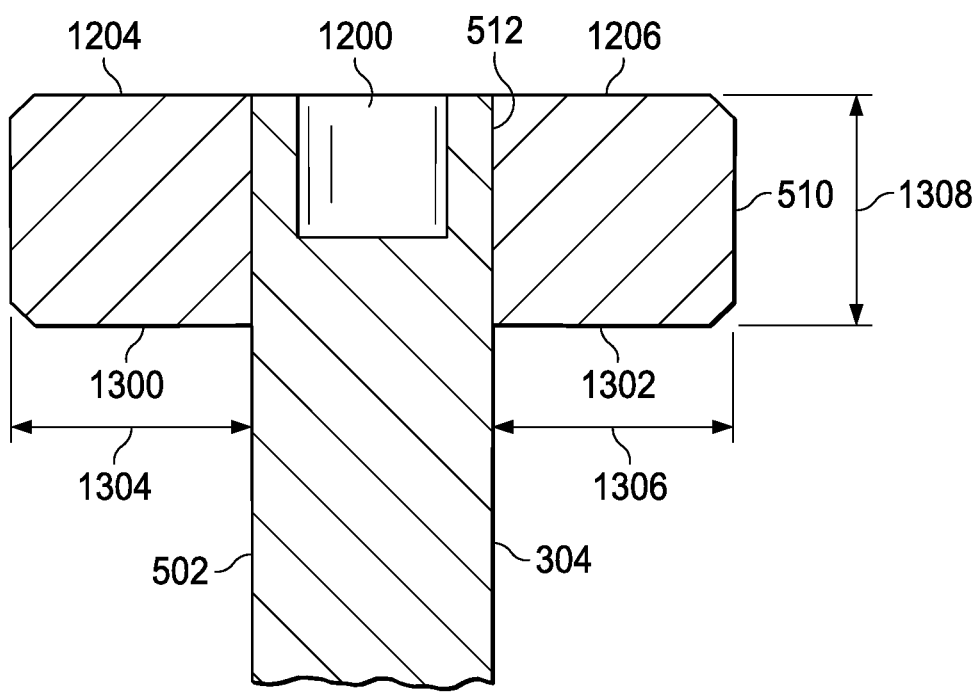
FIG. 13 is an illustration of a cross-sectional view of a flange in accordance with an illustrative embodiment.

Turning now to FIG. 13, an illustration of a cross-sectional view of a flange is depicted in accordance with an illustrative embodiment. In this illustrative example, a cross-sectional view of flange 510 taken along lines 13-13 in FIG. 12 is shown.

In this view, flange 510 on edge 512 of rib 502 forms a T shape. As can be seen in this illustrative example, flange 510 has first side 1204 and second side 1206. First side 1204 has length 1304 and second side 1206 has length 1306. Flange 510 has height 1308.

Length 1304 and length 1306 are substantially the same length in this illustrative example. In this manner, the formation of flange 510 using machining operations may be reduced in terms of time and cost because the equal length of first side 1204 and second side 1206 reduces the length as compared to a flange having one side longer than the other side in this illustrative example. In other words, the overhang of first side 1204 and second side 1206 may be reduced as compared to when a flange only extends in one direction from edge 512.

The values for length 1304, length 1306, and height 1308 may vary depending on the particular implementation. These values may be selected based on the dimensions for channel 804 in second connecting structure 802 in clip 520 from FIGS. 8-11. The values may be selected such that flange 510 may be received within channel 804 with a desired fit. In some cases, the fit may be an interference fit.

The illustration of flange 510 in FIG. 12 and FIG. 13 is only one example of a flange in flanges 208 shown in block form in FIG. 2. This illustration of flange 510 is not meant to limit the manner in which other flanges may be implemented in accordance with an illustrative embodiment. Additionally, although flange 510 is described as having first side 1204 and second side 1206, other illustrative examples may describe these sides as being separate flanges extending from edge 512.

With reference now to FIGS. 14-18, illustrations of processes for connecting a structure to a support structure are depicted in accordance with an illustrative embodiment. The process illustrated in this example is performed to connect skin panel 400 to frame 304.

Figure 14:
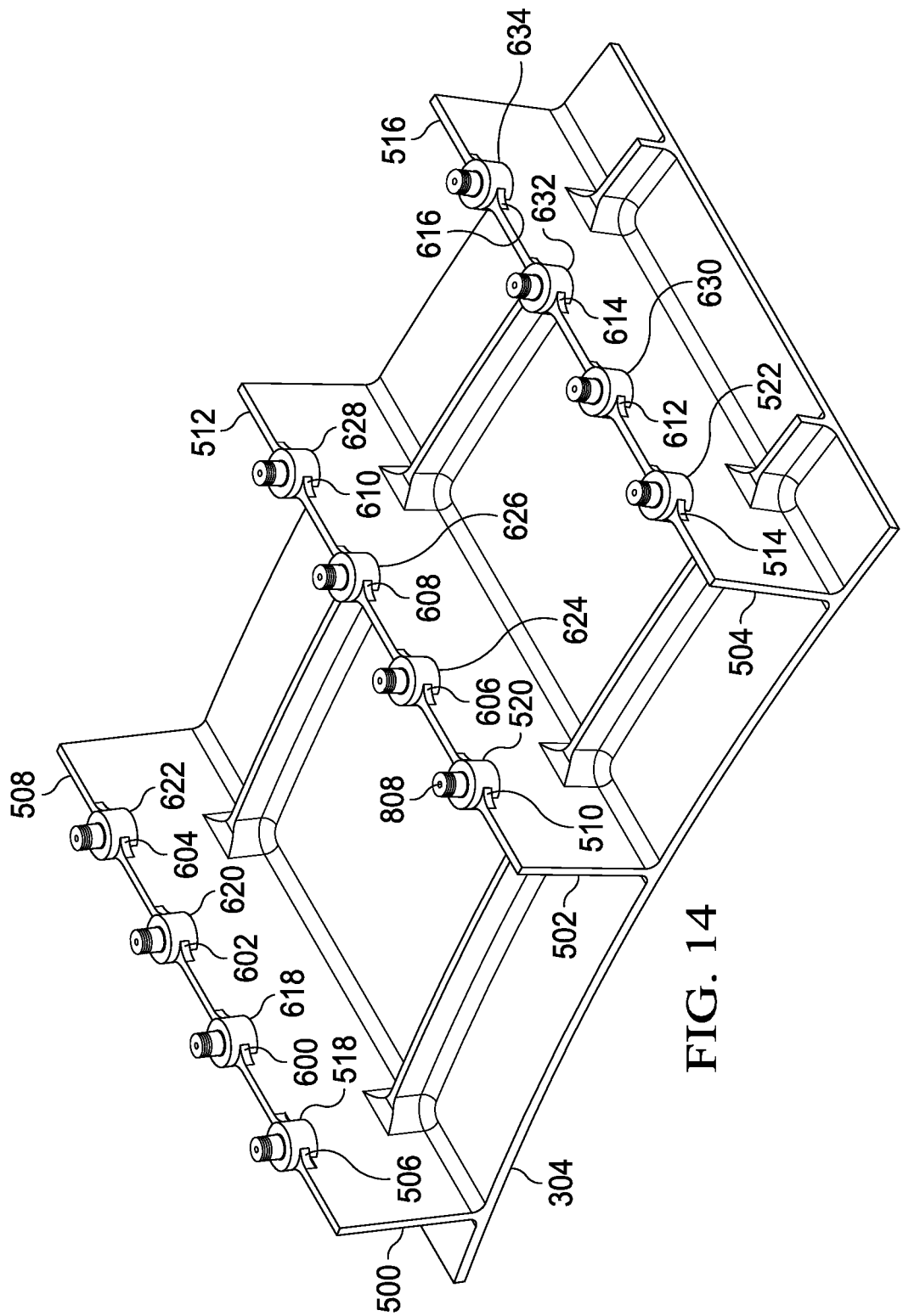
FIG. 14 is an illustration of a frame with clips in accordance with an illustrative embodiment.

With reference first to FIG. 14, an illustration of a frame with clips is depicted in accordance with an illustrative embodiment. In this figure, clips are attached to the flanges. In particular, clips may be moved or positioned such that the channels in the clips receive the flanges in frame 304.

Figure 15:
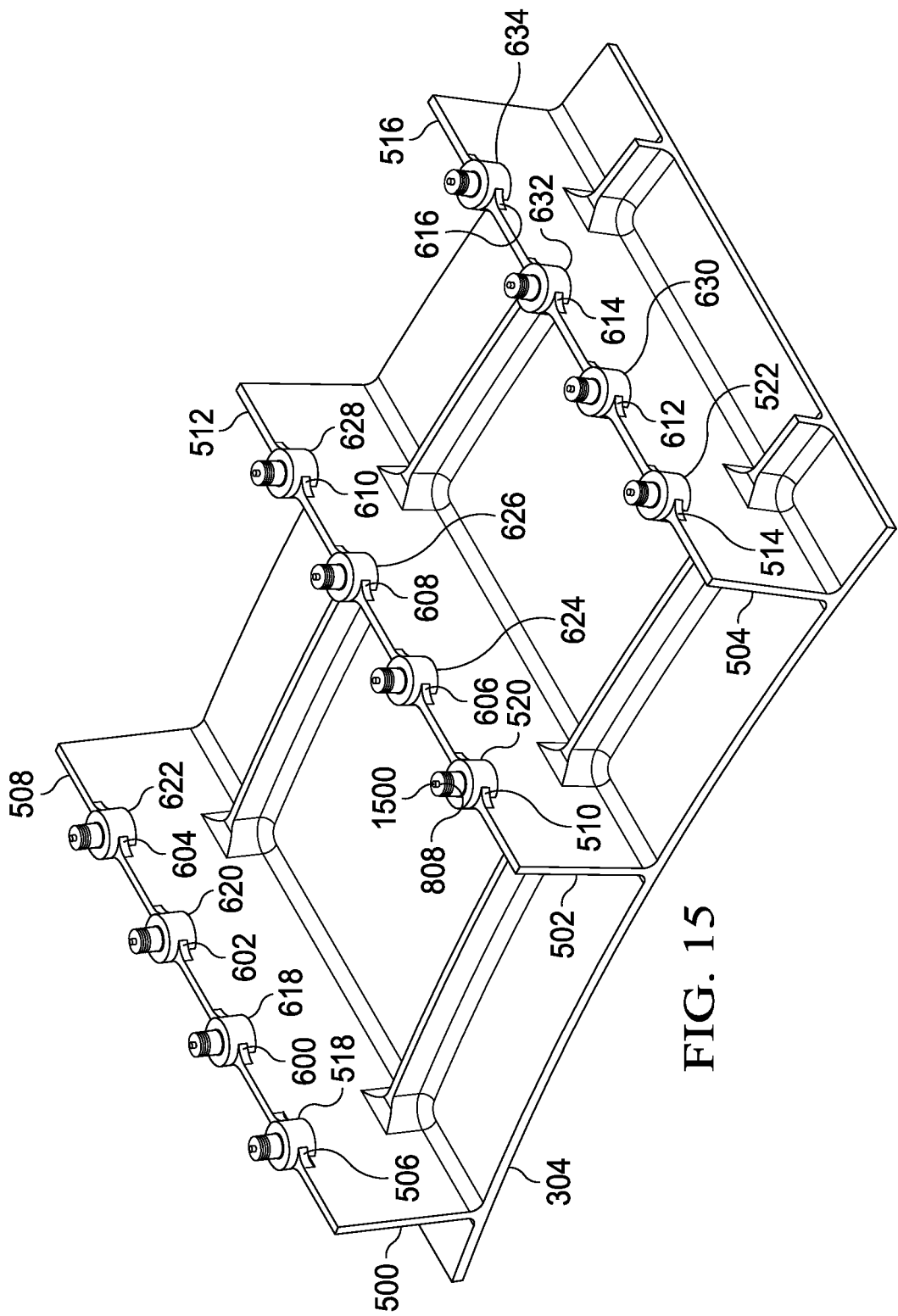
FIG. 15 is an illustration of clips aligned on flanges in accordance with an illustrative embodiment.

With reference now to FIG. 15, an illustration of clips aligned on flanges is depicted in accordance with an illustrative embodiment. In this example, rods have been installed in the openings in the clips and the openings in the flanges to align the clips. These openings may be referred to alignment holes in the illustrative examples.

For example, rod 1500 may be placed into first opening 808 in clip 520 and second opening 1220 (not shown in this view) in flange 510. By placing rod 1500 through first opening 808 and second opening 1220, clip 520 may be aligned in a desired position relative to flange 510. In other words, clip 520 may be aligned in a position over flange 510 in the illustrative example. Rod 1500 may add some strength to counteract a sheer force if left in first opening 808 and second opening 1220.

Figure 16:
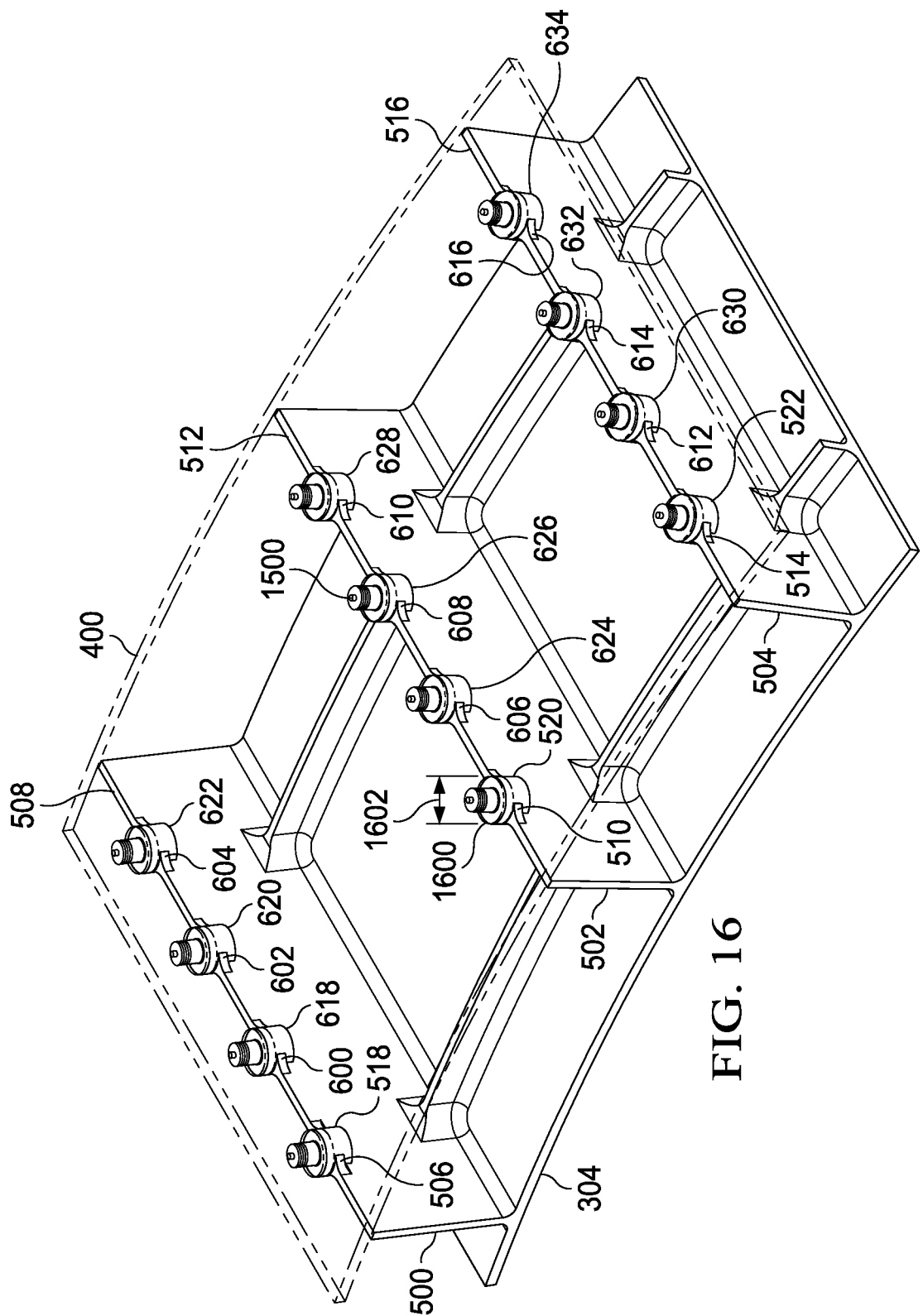
FIG. 16 is an illustration of a skin panel placed on a frame in accordance with an illustrative embodiment.

Turning now to FIG. 16, an illustration of a skin panel placed on a frame is depicted in accordance with an illustrative embodiment. As depicted, skin panel 400 is placed onto frame 304.

Skin panel 400 has holes configured to receive the clips. For example, hole 1600 has diameter 1602. Diameter 1602 has a value that allows for hole 1600 to receive clip 520. In particular, diameter 1602 has a value that is about or greater than diameter 908 of second connecting structure 802 in clip 520 in FIG. 9. In this manner, skin panel 400 may contact edge 508 of rib 500, edge 512 of rib 502, and edge 516 of rib 504.

Figure 17:
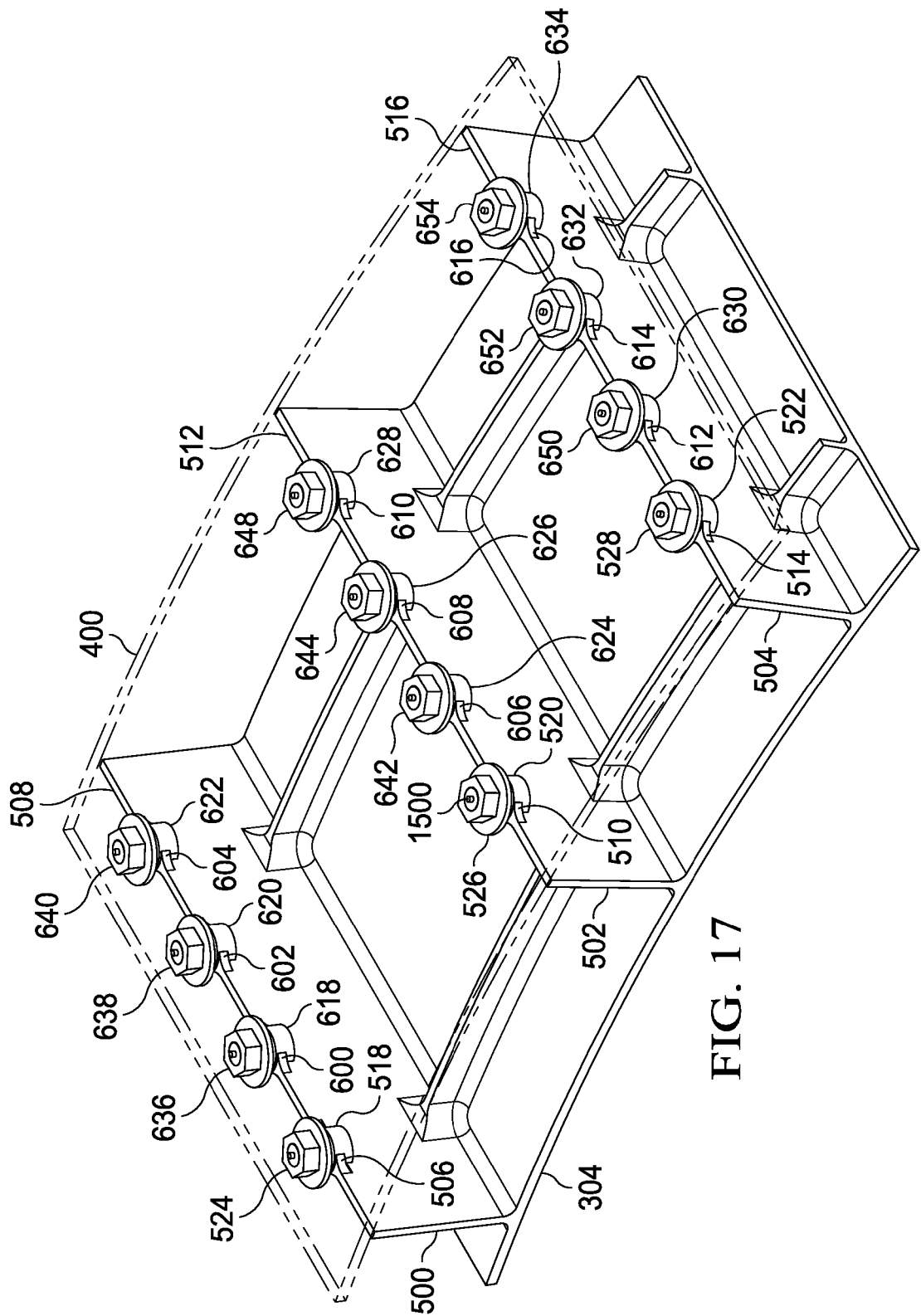
FIG. 17 is an illustration of a skin panel connected to a frame in accordance with an illustrative embodiment.

Turning now to FIG. 17, an illustration of a skin panel connected to a frame is depicted in accordance with an illustrative embodiment. In this illustrative example, fasteners have been connected to the clips with skin panel 400 in place on frame 304.

Figure 18:
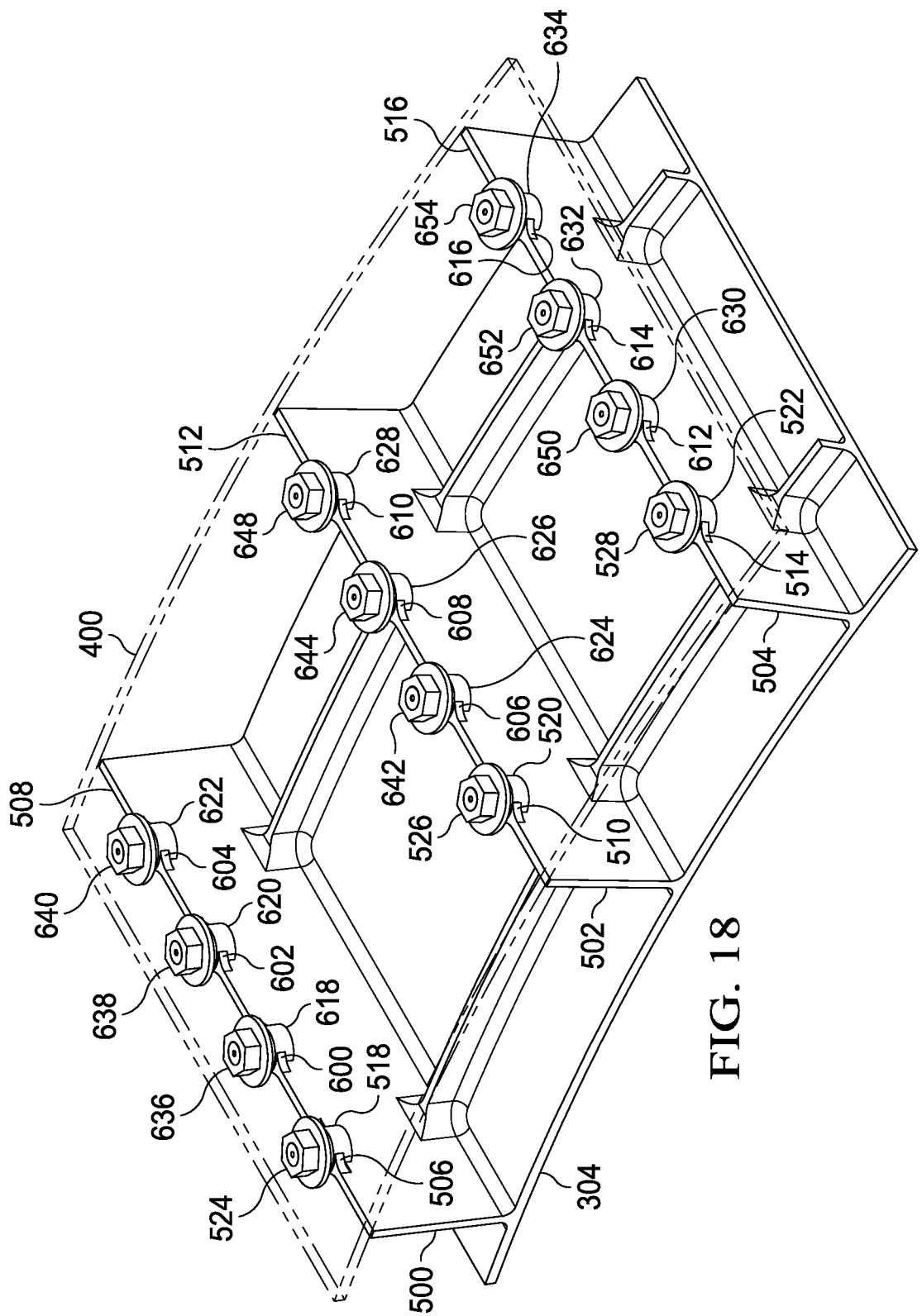
FIG. 18 is another illustration of a skin panel connected to a frame in accordance with an illustrative embodiment.

Next, in FIG. 18, another illustration of a skin panel connected to a frame is depicted in accordance with an illustrative embodiment. In this illustrative example, the rods have been removed from the clips. In other illustrative examples, the rods may be left in place depending on the particular implementation.

The illustrations of the process for connecting a skin panel to a frame in FIGS. 14-18 are only meant as examples and not meant to limit the manner in which skin panel 400 may be connected to frame 304. For example, instead of installing all of the clips followed by inserting rods, a clip may be installed and a rod may be inserted to align the clip before installing another clip.

As another illustrative example, an adhesive, a sealant, or some other material may be placed on the edges of the ribs prior to placing skin panel 400 on frame 304. In still other illustrative examples, an adhesive may be placed on the flanges or on the channels of the clips prior to placing the clips on frame 304 to engage the flanges.

The different components shown in FIG. 1 and FIGS. 3-18 may be combined with components in FIG. 2, used with components in FIG. 2, or a combination of the two. Additionally, some of the components in FIG. 1 and FIGS. 3-18 may be illustrative examples of how components shown in block form in FIG. 2 can be implemented as physical structures.

Figure 19:
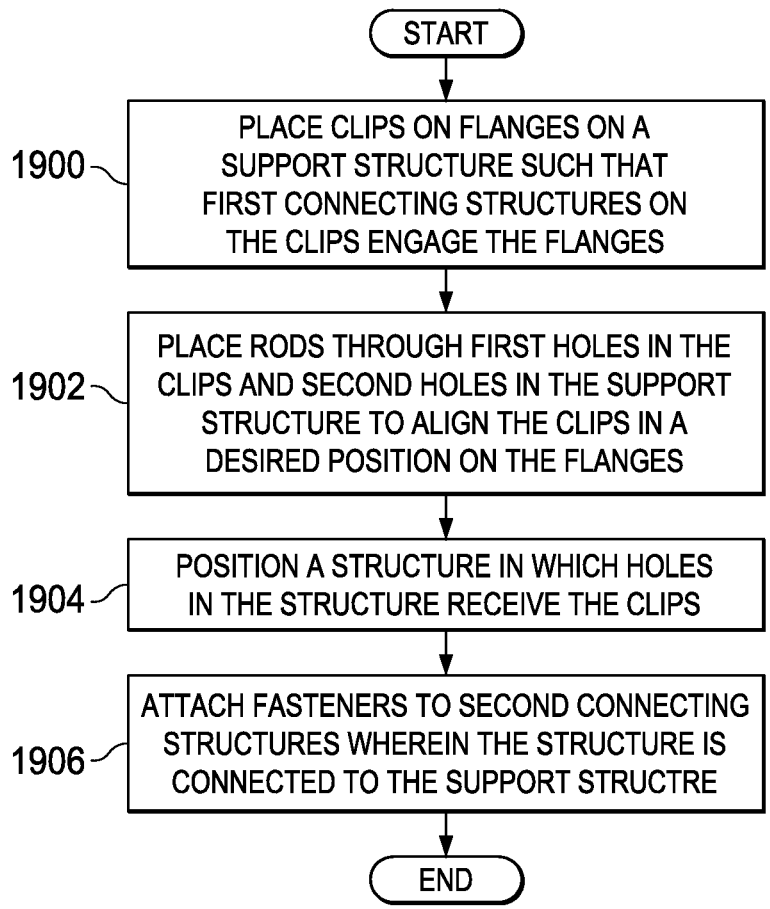
FIG. 19 is an illustration of a flowchart of a process for connecting a structure in accordance with an illustrative embodiment.

Turning now to FIG. 19, an illustration of flowchart of a process for connecting a structure is depicted in accordance with an illustrative embodiment. The process illustrated in FIG. 19 may be implemented using attachment system 200 in FIG. 2. In particular, the process may be used to connect structure 214 to support structure 206 in FIG. 2. The process also may be used to connect skin panel 400 to frame 304.

The process begins by placing clips on flanges on a support structure such that first connecting structures on the clips engage the flanges (operation 1900). The process places rods through first holes in the clips and second holes in the support structure to align the clips in a desired position on the flanges (operation 1902). The process then positions a structure in which holes in the structure receive the clips (operation 1904).

The process then attaches fasteners to second connecting structures wherein the structure is connected to the support structure (operation 1906). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1902 may be omitted in some illustrative examples. Further, an additional operation may be included to remove the rods after the fasteners have been connected to the second connecting structures of the clips. As another example, adhesive or some other material may be placed in the openings prior to inserting the rods if the rods are to remain in place. In another illustrative example, the fasteners may have openings with closed ends such that when the fasteners are installed, the rods are held in place by the closed ends of the fasteners.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in the form of a block diagram in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in the form of a block diagram in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012 and/or during maintenance and service 2014 in FIG. 20. The use of a number of the different illustrative embodiments may substantially expedite the assembly of and/or reduce the cost of aircraft 2100.

In this manner, structures may be connected to each other in a manner that reduces the number of holes with threads for installing fasteners. Additionally, in an illustrative example, with the length of each side of the flange being substantially the same, the time and expense for forming structure 214 shown in block form in FIG. 2 when machining is performed may be reduced. The length of each side of the flange is smaller than when the flange extends from only one side to form an L shape and has a greater length than one of the sides when the flange extends in both directions from the edge to form a T shape. The illustrative embodiments may be especially useful when machining is performed on titanium materials to form frames on which skin panels are attached.

This type of connection may be especially useful depending on the type of materials used in the structures and support structures. For example, the illustrative examples may be implemented for connecting skin panels to support structures in an outlet of an engine for an aircraft. The aircraft may be operated or flown with the attachment system maintaining the connection between the skin panel and the support structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a clip having a first connecting structure, and a second connecting structure configured to be connected to a second structure, wherein the second connecting structure comprises a first opening;
a support structure of an aerospace vehicle having an edge and a second opening along the edge into the support structure; and
a flange extending in a substantially orthogonal direction from the edge around the second opening, wherein the second opening is substantially orthogonal to the flange, wherein the first connecting structure of the clip is configured to receive the flange, and wherein the first opening and the second opening are aligned when the clip is in a desired position.

2. The apparatus of claim 1 further comprising the second structure having a hole there through, wherein the second connecting structure is configured to be placed through the hole in the second structure.

3. The apparatus of claim 2, wherein the second connecting structure receives a fastener to secure the second structure to the second connecting structure.

4. The apparatus of claim 1 further comprising a rod configured to be placed through the first opening and the second opening, wherein the first opening and the second opening are receive the rod when the clip is aligned with the flange in the desired position.

5. The apparatus of claim 1, wherein the first connecting structure has a channel extending there through, wherein a shape of the channel conforms to a cross-sectional shape of the flange, wherein the channel is configured to receive the flange.

6. The apparatus of claim 5, wherein the first connecting structure has a cylindrical shape.

7. The apparatus of claim 5, wherein the channel is configured to receive the flange with an interference fit.

8. The apparatus of claim 1, wherein the support structure further comprises an aircraft frame structure selected from one of a rib, a spar, and a stringer.

9. The apparatus of claim 3, wherein the fastener is a nut.

10. The apparatus of claim 8, wherein the support structure is comprised of a material selected from one of titanium, aluminum, steel, plastic, a composite material, a metal, and polycarbonate.

11. The apparatus of claim 2, wherein the second structure further comprises an aircraft panel structure selected from one of a skin panel, a floor panel, a wall panel, and a honeycomb structure panel.

12. A skin panel attachment system comprising:
a frame of an aerospace vehicle having a number of edges;
a number of flanges formed on the number of edges of the frame;
a number of clips having first connecting structures and second connecting structures, wherein the first connecting structures are configured to receive one of the number of flanges in channels in the first connecting structures, and wherein the second connecting structures are configured be connected to a skin panel, wherein each second connecting structure comprises a first opening;
a number of second openings along the number of edges into the frame, wherein each flange on the number of edges of the frame is formed around one of the number of second openings, and wherein each of the number of second openings are aligned with the first opening of one of the second connecting structures when the number of clips are in desired positions;

the skin panel having holes, wherein the second connecting structures are received in the holes; and fasteners connected to the second connecting structures and securing the skin panel to the frame.

13. The skin panel attachment system of claim 12, wherein the frame is for an outlet of an aircraft engine.

14. The skin panel attachment system of claim 12, further comprising:

a rod configured to be placed through one of the number of first openings and the second opening and align each of the number of clips with one of the number of flanges in the desired positions.

15. A method for connecting structures, the method comprising:

placing clips on flanges on a support structure of an aerospace vehicle such that first connecting structures on the clips receive the flanges;

aligning first openings in a second connecting structure on the clips with second openings on the support structure to position the clips into a desired position with the flanges; wherein the support structure comprises an edge, wherein the second openings are along the edge into the support structure, and wherein the flanges extend in a substantially orthogonal direction from the edge around the second openings;

positioning a second structure, wherein second connecting structures on the clips are received in holes in the second structure; and attaching fasteners to the second connecting structures to secure the second structure to the second connecting structure.

16. The method of claim 15, wherein aligning the first openings with second openings further comprises:

placing rods through the first openings and the second openings, wherein the clips are aligned with the flanges in desired positions.

17. The method of claim 15, wherein placing the clips on the flanges on the support structure comprises:

receiving the flanges in channels in the first connecting structures in the clips, wherein a shape of the channel conforms to a cross-sectional shape of the flange, wherein the channel is configured to receive the flange with an interference fit.

18. The method of claim 15, wherein the fasteners are nuts.

19. The method of claim 15, wherein the support structure further comprises an aircraft frame structure selected from one a rib, a spar, and a stringer, and wherein the second structure further comprises an aircraft panel structure selected from one of a skin panel, a floor panel, a wall panel, and a honeycomb structure panel.

20. A method of operating an aircraft, the method comprising:

flying the aircraft; and holding a skin panel on a support structure of the aircraft, wherein the clips have first and second connecting structures, wherein the first connecting structures are configured to receive one of a number of flanges in channels in the first connecting structures, the second connecting structures are configured to be connected to the skin panel, and each second connecting structure comprises a first opening; wherein the support structure has a number of edges, a number of second openings along the number of edges into the support structure, and a number of flanges on the number of edges of the support structure, each flange being formed around one of the number of second openings; and wherein each of the number of second openings are aligned with the first opening of one of the second connecting structures when the clips are in desired positions, the skin panel positioned such that the clips are received in holes in the skin panel, and fasteners attached to the second connecting structures such that the support structure holds the skin panel.

\* \* \* \* \*